United States Patent [19]

Hinshaw

[11] Patent Number: 5,021,664

[45] Date of Patent: Jun. 4, 1991

[54] METHOD AND APPARATUS FOR CORRECTING THE ENERGY RESOLUTION OF IONIZING RADIATION SPECTROMETERS

[75] Inventor: Steven M. Hinshaw, Knox County, Tenn.

[73] Assignee: Tennelec/Nucleus, Inc., Oak Ridge, Tenn.

[21] Appl. No.: 542,181

[22] Filed: Jun. 22, 1990

[51] Int. Cl.$^5$ .............................. G01T 1/16; G01J 5/02
[52] U.S. Cl. .............................. 250/252.1; 250/370.01; 250/370.06; 250/352; 250/389
[58] Field of Search .............. 250/352, 370.01, 370.06, 250/374, 389, 252.1

[56] References Cited

U.S. PATENT DOCUMENTS 3,872,287 3/1975 Koeman ........................... 364/527
4,937,452 6/1990 Simpson et al. ............... 250/370.06

FOREIGN PATENT DOCUMENTS 1125561 11/1984 U.S.S.R. .............................. 250/389

OTHER PUBLICATIONS

Piet Van Duppen, Paul Duhamel and Jean Vanhorenbeeck, "Timing Properties of a Lege'-Type (Low Energy Germanium) Detector", *Nuclear Instruments and Methods in Physics Research*, vol. A254, No. 2 (Feb. 15, 1987), pp. 401-405 [© Elsevier Science Publishers B.V.].
A. B. Gillespie, *Signal, Noise and Resolution in Nuclear Counter Amplifiers*, New York, Pergamon Press, 1953, pp. 68-71.
Billy W. Loo, Fred S. Goulding and Dexi Gao, "Ballistic Deficits in Pulse Shaping Amplifiers," Lawrence Berkley Laboratory, Calif., LBL-23356, {Note: This may correspond to a publication in *IEEE Trans. Nucl. Sci.*, vol. NS-34 (1988), p. 114}.
F. S. Goulding and D. A. Landis, "Ballistic Deficit Correction in Semiconductor Detector Spectrometers," Lawrence Berkley Laboratory, Calif., LBL-22195, {Note: This may correspond to a publication in *IEEE Trans. Nucl. Sci.*, vol. NS-34 (1987), p. 119}.
M. L. Simpson, T. W. Raudorf, T. J. Paulus and R. C. Trammell, "Charge Trapping Correction in Ge Spectrometers," EG&G Ortec, Tennessee, {Applicant has not provided a source or date for this document}.

*Primary Examiner*—Constantine Hannaher
*Assistant Examiner*—Jacob M. Eisenberg
*Attorney, Agent, or Firm*—Pitts and Brittian

[57] ABSTRACT

A method and apparatus for correcting for the ballistic deficit effect that occurs when determining the spectra of radioactive substances with an ionizing radiation detector. Two pulses derived from each output pulse of the detector, each having different peaking times but both containing effects of the ballistic deficit, are compared to produce an error signal related to the difference of the peak heights of these two pulses. A part (or all) of the error signal is added to one of the pulses to produce a corrected amplitude pulse. In order to effectively compare the two pulses, each is separately stretched at its peak height. The corrected amplitude pulse is reformed for better handling by multichannel analyzer analog-to-digital converters, with a plurality of these reformed corrected amplitude pulses then being analyzed by the multichannel analyzer to achieve a nuclear spectra for which the ballistic deficit has been corrected. The two pulses that are created from the detector pulses can be of similar shape configuration, or can be different in shape. An example is given of a unipolar pulse and a bipolar pulse that is a derivative of the unipolar pulse. The method and apparatus is paramount when applied to the gamma ray spectra obtained from a germanium gamma ray detector.

14 Claims, 6 Drawing Sheets

METHOD AND APPARATUS FOR CORRECTING THE ENERGY RESOLUTION OF IONIZING RADIATION SPECTROMETERS

DESCRIPTION

1. Technical Field

The present invention relates generally to correcting the energy resolution of an ionizing-radiation spectroscopy system, and more particularly to correcting for the ballistic deficit that accompanies the measurement of gamma-rays using a germanium gamma-ray spectrometer. However, the invention is applicable to other ionizing radiation detectors, such as other solid state detectors and gas filled detectors.

2. Background Art

Typically, the abundance of particles or rays displayed as a function of their energy constitutes an energy spectrum. Peaks in such a spectrum permit the identification of the events causing them. The narrower the spectral peaks, the closer together they may be and still afford unambiguous identification. A spectrometer producing narrow spectral peaks is described as one having good energy (or peak) resolution.

Alpha particles and gamma rays are just two of many examples of particles and rays that cause ionization in matter. Certain materials when suitably processed and contained can be used as detectors of such ionizing radiation. Examples of suitable materials are highly purified germanium and a variety of gases. The ions generated in the detection process are collected at the detector terminals and converted to pulses of voltage in an amplifier connected to them. The pulse duration is typically in the microsecond range and is determined by an electrical pulse-shaping network.

The collection time of the ions in the detector is a finite fraction of the pulse-processing time in the amplifier. This creates a loss in pulse height occurrence known as ballistic deficit. Because the exact location and path of the ionization in the detector varies randomly from event to event, the collection time and hence the ballistic deficit also varies randomly. This variation has the effect of broadening the peaks in a spectrum, thereby adversely affecting the minimum spacing between those that can be distinguished from each other.

Another mechanism causing a loss and variation in pulse height is due to trapping of ions in the detector before they are all collected. As with ballistic deficit, trapping varies randomly between events and causes a loss in energy resolution. In germanium detectors, trapping is caused by lattice defects or impurities introduced at the time of manufacture or by later radiation damage. In gas-filled detectors, trapping is caused by electronegative impurities such as oxygen.

In a spectrometer where the peak of the voltage pulse is used as an indication of the energy of the ionizing event, it has been shown that ballistic deficit can be reduced by increasing the width of the shaped pulses in the amplifier (see A. B. Gillespie, *Signal, Noise and Resolution in Nuclear Counter Amplifiers*, Pergamon Press, 1953). However, this has the undesirable effect of reducing the rate at which pulses can be processed.

Another prior-art approach is a scheme known as gated integration, which responds to the area under the pulse rather than to the peak height. This has the advantage of reducing the pulse processing time for the same energy resolution. However, this method is more expensive than the simpler shaping networks commonly used, and even gated integrators are vulnerable to ballistic deficit when the processing time is made less than the longest collection time in the detector.

Recently, a more accurate solution was introduced into the art. This solution is discussed in technical papers written by B. W. Loo and F. S. Goulding entitled "Ballistic Deficits in Pulse shaping amplifiers" (essentially a mathematical analysis of the problem) and another by F. S. Goulding and D. A. Landis entitled "Ballistic Deficit Correction in Semiconductor Detector Spectrometers". The solution of Goulding, et al., is based upon the fact that there is a time delay between the peak of a pulse affected by ballistic deficit and one that is not affected. The ballistic deficit is proportional to a fraction comprising the square of said delay time divided by the time required for the undelayed pulse to reach its peak amplitude. The latter quantity is commonly referred to as the peaking time. Goulding, et al., devised a means of generating an error signal proportional to the numerator of the fraction and using it in a way that compensates for the ballistic deficit. This method results in a modest improvement, and it also provides correction for the charge-trapping problem of the prior art (see "Charge Trapping Correction in Ge Spectrometers" by M. L. Simpson, et al.). Although the errors due to ballistic deficit and charge trapping are reduced by this method, it is difficult and time consuming to make the necessary adjustments in the electronic circuits, and a special (therefore expensive) pulse generator is required. Thus, this solution is impractical for incorporation into commercial instruments designed for use by non-technical personnel in the routine analysis of spectra.

Accordingly, it is an object of the present invention to provide a method and apparatus for the correction of ballistic deficit in spectrometers, the method and apparatus being within the price range and skills of every-day users of such equipment.

It is a further object of the present invention to eliminate the need for delicate adjustments or special pulse generators by utilizing an amplitude difference rather than a time difference between two signals as a means of correcting for ballistic deficit in the measurement of spectra.

It is a further object of the present invention to provide a method and apparatus for the correction of ballistic deficit in spectrometer systems by comparing the amplitudes of two shaped signals having different peaking times, the difference in amplitudes being converted into an error signal that is used to compensate for the problem.

It is a further object of the present invention to produce from a detector two pulses, one of them unipolar in shape and the other bipolar, passing both pulses through peak-detecting circuits, then producing an error signal related to the difference in peak heights of the two signals, the error signal being added all or in part to one of the signals for processing in the spectrum analyzer.

It is a further object of the present invention to use the unipolar and bipolar pulses from conventional commercially-available amplifiers which are used in spectrometer applications by passing the pulses through peak-detecting circuits, then producing an error signal related to the difference in peak heights of the pulses, this error signal added all or in part to one of the pulses for processing in the spectrum analyzer.

These and other objects of the present invention will become apparent upon consideration of the figures listed below and the full description of same.

DISCLOSURE OF THE INVENTION

In accordance with the present invention, an amplified pulse derived from the detector is converted into a pair of pulses with different peaking times. The pulses may both be unipolar in shape (having a single lobe on one side of the baseline), bipolar (having two lobes, one on either side of the baseline), or one may be unipolar and the other bipolar. The bipolar pulse may be derived from the unipolar one by a circuit that performs the equivalent of a mathematical differentiation or approximation thereto. The two shaped pulses are then passed through circuits that generate signals proportional to their peak heights, the circuits hereinafter referred to as peak detectors. The peak signals are then compared in a difference amplifier to produce an error signal. In the absence of ballistic deficit, the separate pulses are set equal to each other by appropriate circuit elements, thereby making the error signal zero. When ballistic deficit occurs, a non-zero error signal will occur, and an appropriate fraction thereof is added in a summing amplifier to one of the two shaped pulses such that the sum signal is compensated for the ballistic deficit. The compensated sum signal is then reshaped, if such reshaping is needed, for processing by a multi-channel analyzer. If both unipolar and bipolar pulses are used, the error signal is usually (but not necessarily) summed with the unipolar one. When a conventional spectrometer already has an amplifier that provides separate unipolar and bipolar output pulses, no additional pulse formation is required.

BEST MODE FOR CARRYING OUT THE INVENTION

Figure 1A:
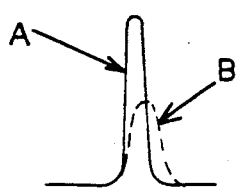
FIGS. 1A through 1E are depictions of pulses generated in a typical detector by an ionizing event and the waveforms of the pulses developed in a conventional ionizing radiation spectrometer in order to depict the problem of ballistic deficit.

In order to have a better understanding of the ballistic deficit problem, and thus the reason that the present invention is needed, the current pulse waveform generated in a typical detector by an ionizing event and the shapes of the pulse waveforms developed in a conventional ionizing radiation spectrometer are depicted in FIG. 1A through 1E. The amplitude axis in each is vertical and the time axis is horizontal. The same time scale is used for all of the waveforms; however, the amplitude scale for FIG. 1A is different from those in FIGS. 1B through 1E.

For example, shown in FIG. 1A is the current pulse generated in a typical detector by an ionizing event. The solid line pulse A in FIG. 1A is representative of one with normal collection time, and the dotted line pulse B is one of the same energy (area) but with slower collection time caused by the orientation of the ionization path in the detector.

Figure 1B:
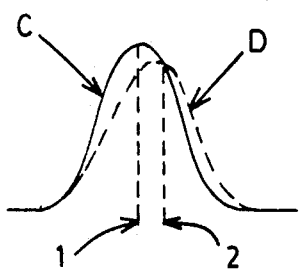

FIG. 1B illustrates the pulses after shaping by the amplifier filter network of the spectrometer, with the solid line pulse C as the response to current pulse A, and the dotted line pulse D as the response to the current pulse B. Note that pulse D is lower in amplitude and delayed with respect to pulse C. The difference in amplitude is the ballistic deficit caused by the different durations of current pulses A and B. The respective peaking times of these pulses C and D are indicated on the time axis at 1 and 2.

Figure 1C:
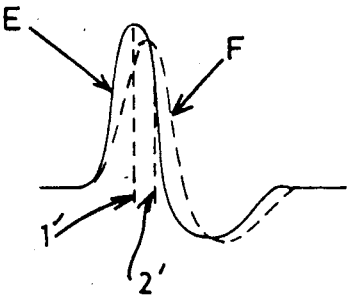

FIG. 1C represents the mathematical derivatives of pulses C and D, respectively. It can be seen that the result of a differentiation is to produce bipolar pulses E and F which have lobes on either side of the baseline. If the differentiation is exact, the baseline crossing points occur at exactly the same time as the times of the peaking times of pulses C and D (see FIG. 1B). However, if the differentiation is not exact, the base crossing points 1' and 2' will be delayed with respect to points 1 and 2. Such delays, however, have no bearing on the operation of the present invention.

Figure 1D:
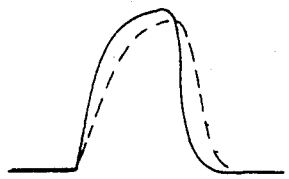
Figure 1E:
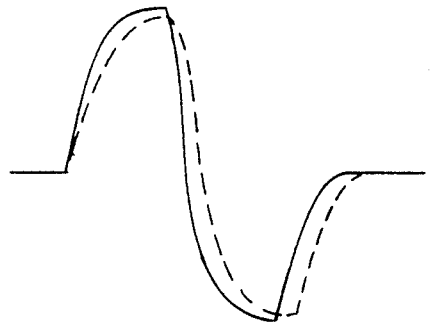

FIGS. 1D and 1E represent pulse waveforms obtained by delay line pulse shapers of a conventional spectrometer. While the shapes are somewhat different than from those in FIGS. 1B and 1C, they do not present any impediment to the operation of the present invention.

Figure 2A:
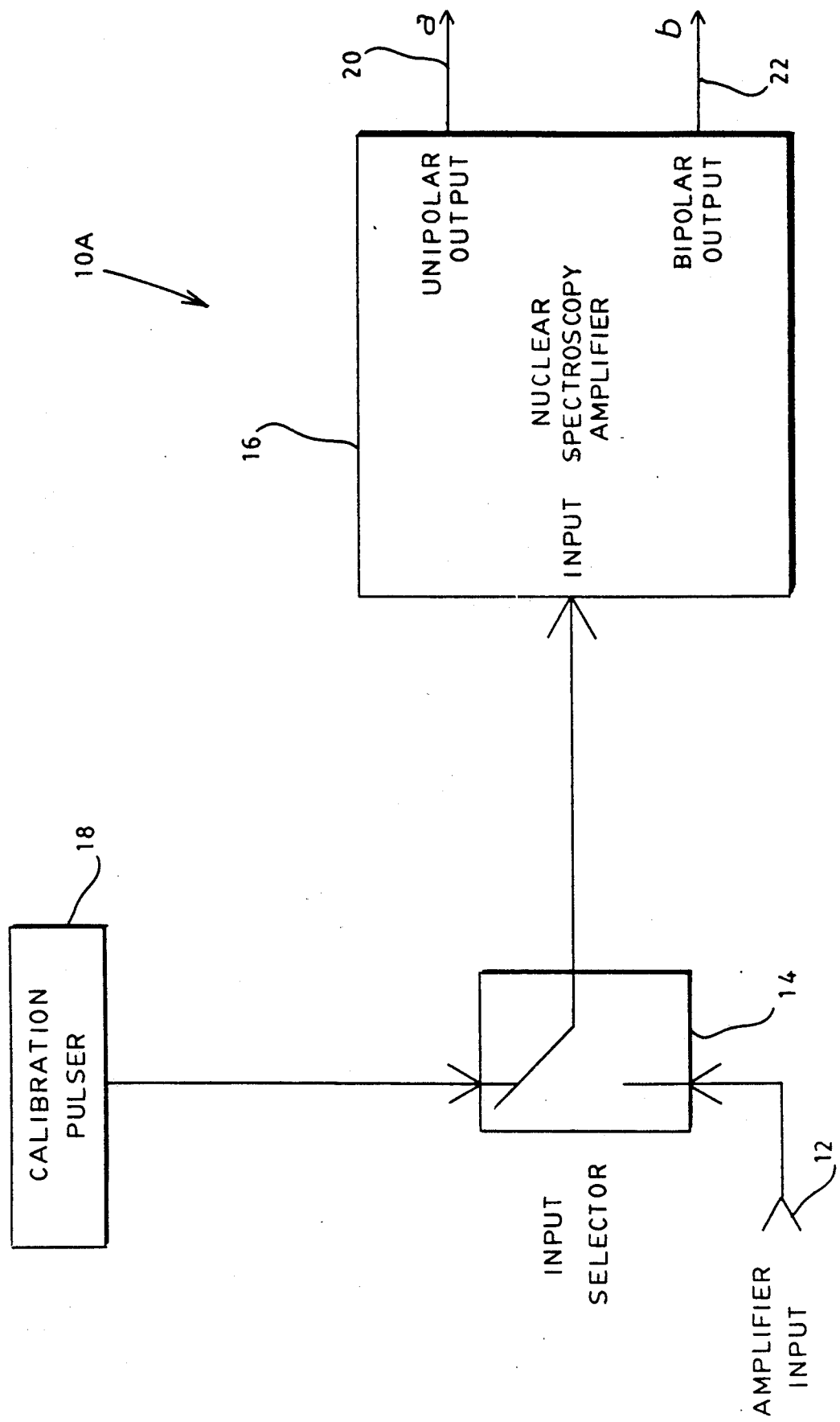
FIG. 2A is a portion of a block diagram of an improved spectrometer circuit of the present invention for use in correcting for ballistic deficit errors.

Referring now to FIG. 2A, shown therein is a block diagram of a portion 10A of the present invention. An input pulse is received at 12 therein from a preamplifier associated with a detector (not shown). This pulse is applied to a switch means 14 (for purposes described hereinafter) and thence to the input of a substantially conventional amplifier means 16. Typically, this amplifier is found in Tennelec Spectrometer Model TC 244. In addition, a calibration pulser means 18 is optionally provided to input a standardized pulse to the switch means 14 and thus to the amplifier means 16.

When this amplifier of the Tennelec Spectrometer is used, there are two output pulses produced: one is a unipolar pulse at output 20; and a bipolar pulse at output 22 which is the derivative of the unipolar pulse. Both pulses are related to the input pulse from the detector and so have characteristics of the effect of the ballistic deficit and charge trapping. However, they will have different peaking times. If an amplifier means is used that does not normally have these two outputs available, appropriate means must be added in order to have two pulses of different peaking times to carry out the present invention. The pulses can be the unipolar and bipolar pulses as derived from the Tennelec instrument, or could be two unipolar pulses having different peaking times that are derived from the one pulse from the spectrometer detector. The content of conventional amplifiers for use in ionizing radiation spectrometers will be well known to persons skilled in the art.

Figure 2B:
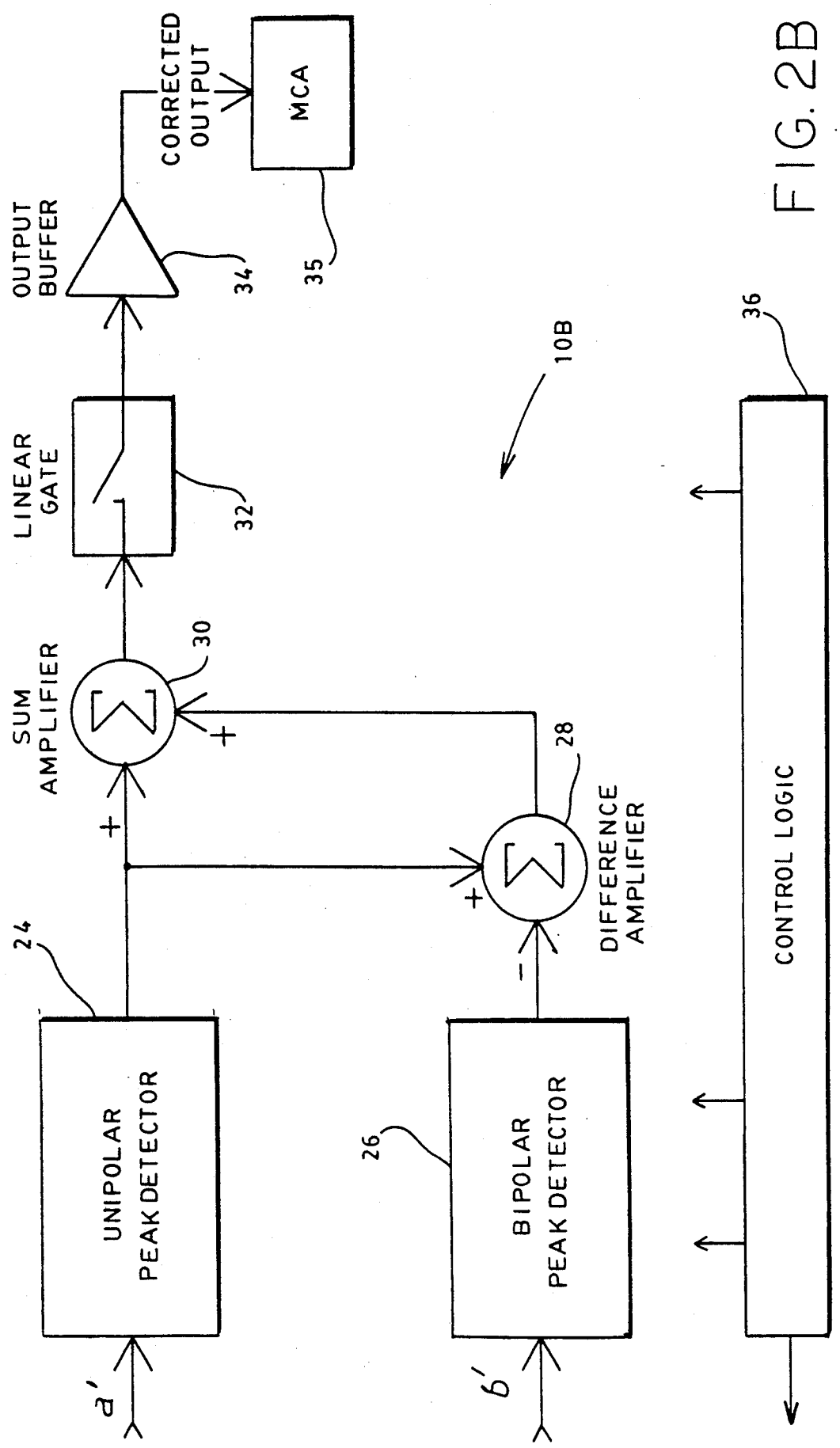
FIG. 2B is another portion of the block diagram of the improved spectrometer circuit of the present invention that is complementary to the portion of FIG. 1A, this portion being a ballistic deficit and charge trapping correction circuit of the present invention.

Shown in FIG. 2B is a block diagram of the remainder (10B) of the present invention that includes the ballistic deficit and charge trapping correction section.

The circuits of this FIG. 2B connect to those of FIG. 2A at points labeled a—a' and b—b'. Thus, the unipolar pulse from the amplifier means 16 is applied to the input of a unipolar peak detector means 24. In a like manner, the bipolar pulse (or the second pulse) from the amplifier means 16 is applied to the input of a bipolar peak detector means 26. Details of these peak detector means 24, 26 is given hereinafter with regard to FIG. 3. Each of these peak detector means produces a stretched output pulse of a similar shape (see wave form), but with an amplitude difference corresponding to the ballistic deficit and charge trapping effects. If there is essentially no error introduced within the radiation detector, there will be essentially no difference in the outputs of the two peak detecting circuit means. However, as with most practical applications, there will be error introduced by the charge collection events in the detector. Thus, these two outputs are introduced into a difference amplifier means 28 such that the output thereof will reflect this error. This difference (error) signal, or at least a portion thereof, is fed into a sum amplifier means 30 where it is typically combined with the output of the unipolar peak detector means 24. (The error signal could be combined with the output of the bipolar peak detector.) Thus, the output of the unipolar peak detector means is corrected in the amount of the error. It will be understood, however, if pulses other than the unipolar and bipolar shapes illustrated are used, any reference to unipolar pulse can be "Pulse I", and any reference to bipolar pulse can be "Pulse II". At any time, either during operation of the instrument or at the initiation of the taking of data, this error signal can be adjusted to zero by feeding a signal from the calibration pulser means 18 through the system (the amplifier means 16 and the two peaking detector means 24, 26) and adjusting the gains of the signal channels in the amplifier means so that the output of the difference amplifier means 28 is zero.

Figure 4:
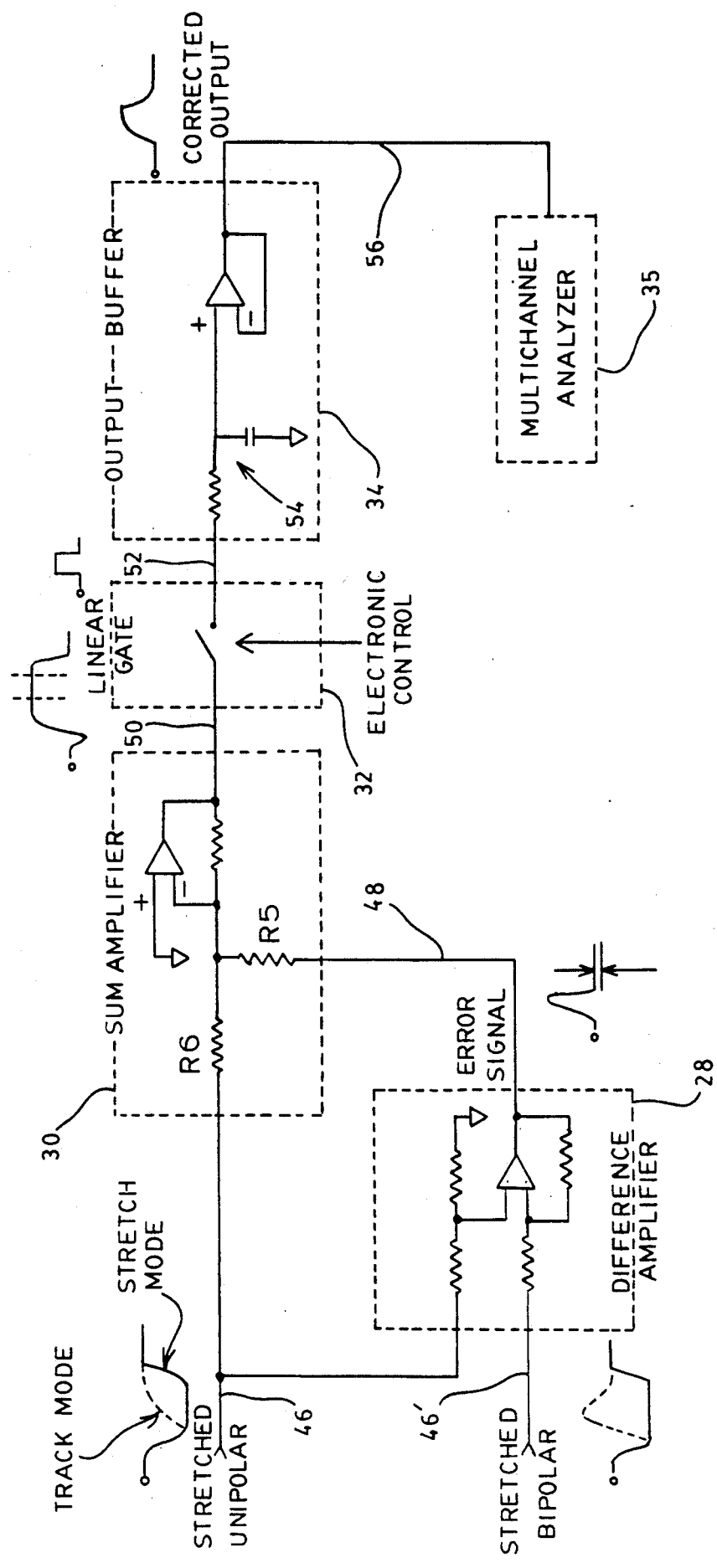
FIG. 4 is a schematic diagram a difference amplifier means, a sum amplifier means and a gating circuit means for providing a corrected output signal from the present invention as shown in the block diagram of FIG. 2B.

This corrected amplitude pulse usually cannot be used in this shape; heretofore, it is passed through a linear gate means 32 so as to produce a pure step-shaped pulse as shown. This is then put into correct pulse shape for the final multichannel analyzer 35 using an output buffer means 34. The typical details of the gate means and buffer means are shown in FIG. 4. The operation of the peak detector means 24, 26 and the components through the gate means 32 are controlled through a control logic means generally indicated at 36. The content of this control logic means 36 will be understood by persons skilled in the art upon a consideration of the detailed descriptions of the peak detector means, the difference amplifier means, and the linear gate means that follow.

Figure 3:
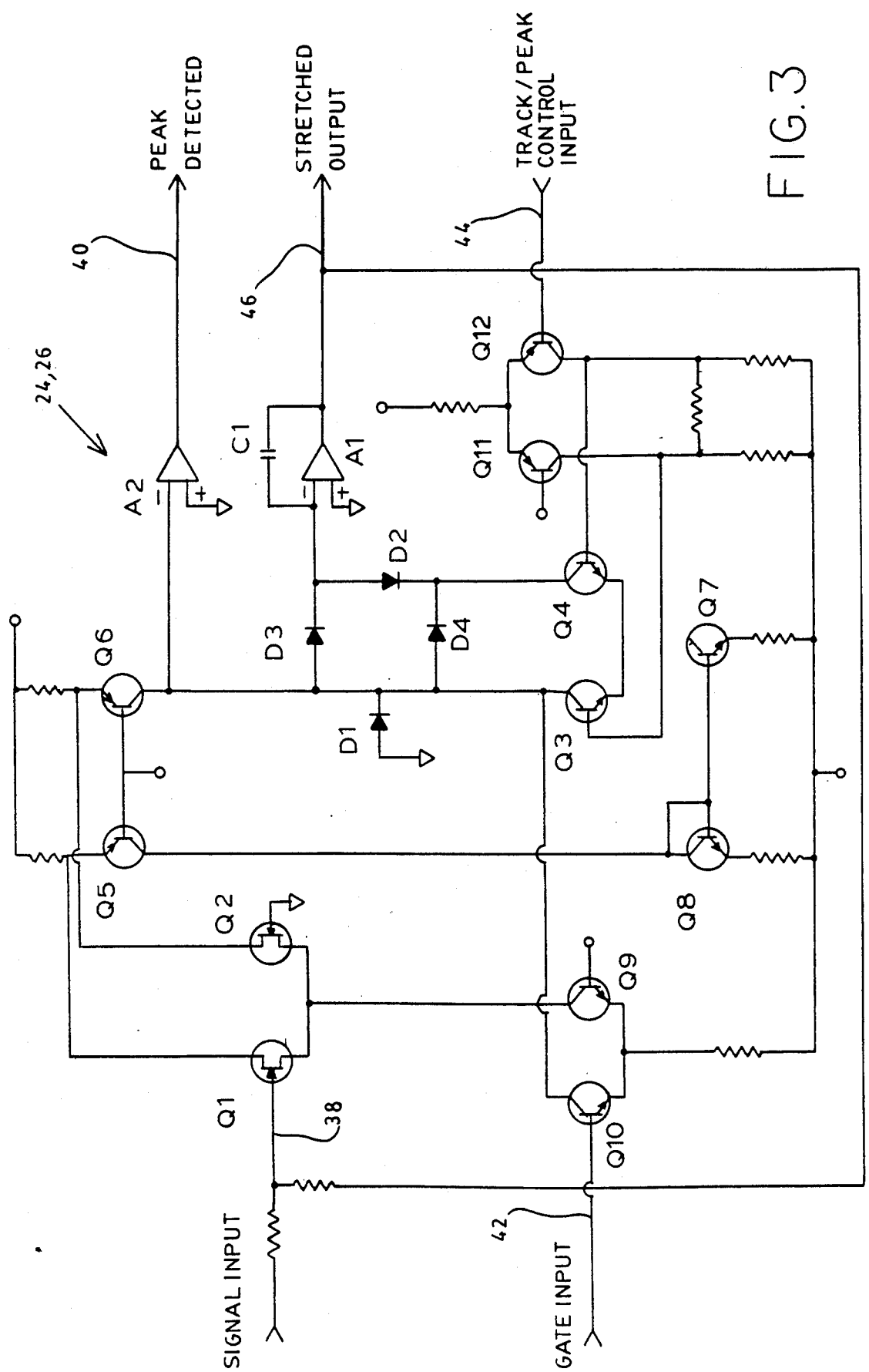
FIG. 3 is a schematic diagram of a typical peak detecting circuit means for use in the circuit portion of FIG. 2B.

A schematic circuit diagram for a typical peak detector means 24, 26 is illustrated in FIG. 3. As indicated, one form of the present invention utilizes a unipolar pulse and a bipolar pulse. If other pulse configurations are utilized in the present invention, the peak detector means could have other configurations as long as they produce output pulses that can be compared to determine an error signal that is produced by the ballistic deficit and charge trapping problems discussed above. In this particular embodiment of a peak detector means, the input pulse (from 20 or 22 of FIG. 1A) is impressed at 38 to transistors Q1 and Q2. These are essentially a monolithic "J-FET", with their outputs directed to transistors Q5 and Q6: these are essentially a PNP folded cascade stage. The output of Q5 drives a current mirror stage made up of Q7 and Q8 such that the currents through each are in phase and the current through Q7 can be added to the current of Q6 to provide double current to the amplifier A1. In order that the input can be properly detected and stretched, a signal indicating that a peak has been received is passed through amplifier A2 (at 40) to the control logic means 36 (see FIG. 2B) and, as a result, a gate input signal is provided at 42 to transistors Q9, Q10 to prevent acceptance of the next input pulse at 38. This gate input signal is derived from the control logic means 36.

The peak detector circuit (24 or 26) can be operated in two modes, these being regulated by the control logic means 36. In one mode, referred to "track mode", an appropriate signal from the control logic means 36 is impressed at 44 on Q11, Q12. Under this condition, the capacitor C1 associated with amplifier A1 is charged through diode D3 and discharged through diode D2 such that the output at 46 follows the input pulse at 38. In the second mode, or "peak mode" as controlled by the control logic means 36, capacitor C1 is charged through diode D3; however, it cannot be discharged such that the output signal at 46 is a "stretched peak". It is this mode that is used when the stretched output of peak detector means 24 is compared to the stretched output of peak detector means 26 in order to obtain an error signal from the difference amplifier means 28 (see FIG. 2B).

FIG. 4 is a schematic drawing illustrating the remaining components of the correction portion of the present invention. The difference amplifier means 28, as shown, receives the output pulses (46, 46') of both of the peak detecting means 24, 26. These are compared and, if any difference is determined, there is an output signal at 48 whose amplitude is related to that difference or error. This error signal, or a portion thereof as established by resistors R5 and R6, is added to the output of peak detecting means 24 in the sum amplifier means 30. Typically, about 0.7 to 0.9 of the error signal is added to one of the stretched pulses. The exact amount is determined by the shaping networks within the amplifier means 16. The resultant sum is a compensated amplitude pulse at 50. The specific makeup of the difference amplifier means 26 and the sum amplifier means 30 will be well known to persons skilled in the art.

The compensated amplitude pulse (the stretched signal from the peak detector means 24 as modified by the error signal from the difference amplifier means 28) is passed to the linear gate means 32. This gate means, which is an electronic switch, the operation of which will be understood by persons skilled in the art, is operated by the control logic means 36 so as to sample a center portion (e.g., a few microseconds) of the compensated amplitude pulse to produce an output pulse at 52 that is essentially a rectangular pulse, as shown, whose amplitude represents the corrected signal amplitude. The buffer output means 34, which includes a low-pass filter 54, then converts this rectangular pulse into a pulse at 56 having a preferred shape with an exponential rise and fall time for processing in the analog-to-digital converters in the multichannel analyzer 35.

Figure 5:
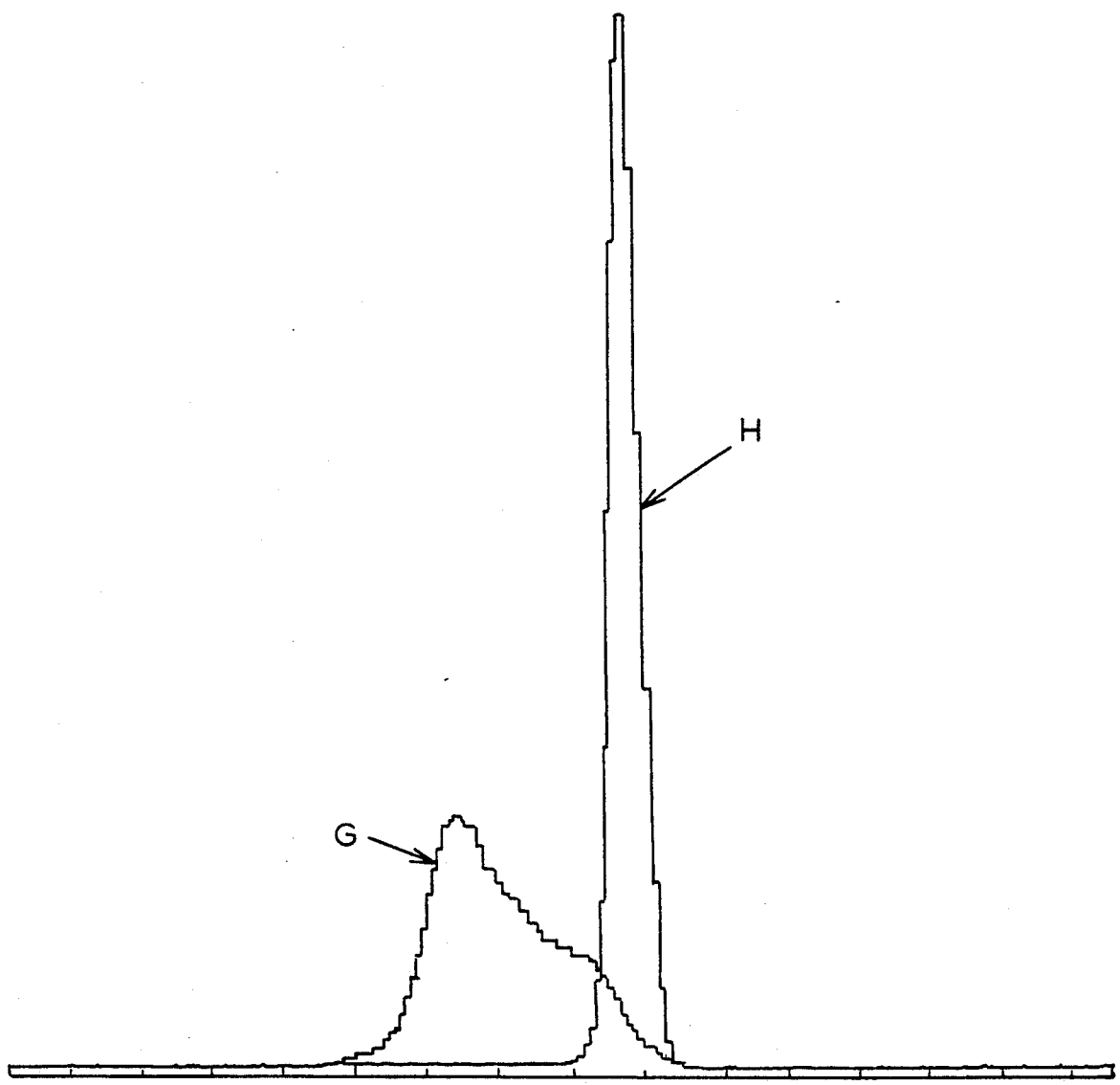
FIG. 5 is a gamma ray spectral plot for cobalt-60 showing the improvement in energy resolution as achieved using the present invention.

A typical application of the invention is the gamma ray spectrometer analysis of the 1.33 MeV gamma ray from cobalt-60 is depicted in FIG. 5. This illustrates, in plot G, a typical spectrum that is observed without any correction for ballistic deficit. It can be seen that the peak is very broad such that another gamma ray of similar energy would be obscured. However, in plot H, which is a plot using the present invention, the peak is substantially sharpened, with a peak height that would be difficult to miss when studying a mixed gamma ray source.

From the foregoing, it will be understood that the present invention provides an improved method of correcting for ballistic deficit errors that occur during the spectrometer analysis of gamma ray emission using large germanium detectors. As stated above, the method (and apparatus) is applicable to other ionizing radiation spectrometers. According to the method, the pulses from the detector are converted to two separate pulses having different peaking times, each of these pulses being effected by the ballistic deficit. A comparison is made of the peak amplitudes of these two pulses, and an error signal is generated from this difference that is added to one of the stretched pulses to produce a compensated amplitude pulse. A central portion of this compensated amplitude pulse is then typically reshaped for use in the multichannel analyzer portion of the spectrometer. As discussed, the two pulses that contain the effect of the ballistic deficit can be a unipolar pulse and a bipolar pulse that is the derivative of the unipolar pulse.

It should be understood that, although certain specific circuits are shown and described, these are for illustration purposes only and not for creating a limitation of the present invention. Rather, the invention is to be limited only by the appended claims or their equivalents when taken together with the full disclosure of the invention.

I claim:

1. A method for achieving correction for ballistic deficit during the analysis of nuclear spectra using an ionizing radiation detector, said ballistic deficit due to the occurrence of charge collection at different locations within said detector, which comprises the following steps:
   deriving output pulses from said detector due to ionizing radiation produced charge collection within said detector, each of said output pulses having a rise time governed by said location of said charge collection within said detector, said ballistic deficit affected by said rise times of said output pulses;
   producing two separate pulses from each of said output pulses of said detector in a pulse forming means, said two separate pulses having different peaking times;
   feeding said two separate pulses into two separate peak detecting means to produce two stretched pulses;
   comparing said two stretched pulses so as to produce a difference signal representing a difference in amplitude between peaks of said two stretched pulses;
   adding at least a portion of said difference signal to one of said two stretched pulses to produce a corrected amplitude pulse; and
   analyzing a plurality of corrected amplitude pulses in a multichannel analyzer to determine said nuclear spectra that is corrected for said ballistic deficit.

2. The method of claim 1 wherein said two separate pulses derived from said output pulse of said detector and produced in said pulse forming means are a unipolar pulse and a bipolar pulse that is a derivative of said unipolar pulse.

3. The method of claim 1 further comprising the steps:
   providing a calibration pulse for processing in said two separate peak detection means; and
   adjusting said pulse forming means whereby said error signal from said comparing said two stretched output pulses of said separate peak detection means is zero in the absence of said output pulses from said detector.

4. The method of claim 1 wherein said comparing step is carried out with a difference amplifier means which receives said two stretched pulses from said two separate peak detection means.

5. The method of claim 1 wherein said adding step is carried out with a sum amplifier means which receives said error signal and adds said error signal to said stretched pulses of one of said two peak detection means to produce said corrected amplitude pulse.

6. The method of claim 5 further comprising the steps of passing said corrected amplitude pulse through a gating means to produce a rectangular pulse, and passing said rectangular pulse through a buffer means to produce a pulse having an exponential rise time and an exponential fall time so as to be compatible with said multichannel analyzer.

7. Apparatus for achieving correction for ballistic deficit during the analysis of nuclear spectra using an ionizing radiation detector, said ballistic deficit occurring due to the occurrence of charge collection at different locations within said detector, which comprises:
   pulse producing means for receiving output pulses from said detector due to ionizing radiation produced charge collection within said detector, each of said output pulses having a rise time governed by the position of said charge collection, and for producing two separate pulses from each said output pulse of said detector, said two separate pulses having different peaking times;
   separate peak detecting means for separately receiving each of said two separate pulses from said pulse producing means and for producing separate output stretched peak pulses;
   difference determining means for receiving said separate output stretched peak pulses and for producing an error signal proportional to any difference in amplitude between said separate output stretched peak pulses;
   adding means for adding said error signal to one of said output stretched peak pulses to produce a corrected amplitude pulse corrected for said ballistic deficit; and
   multichannel analyzer means for receiving a plurality of said corrected amplitude pulses and for determining said analysis of said nuclear spectra.

8. The apparatus of claim 7 wherein said two separate pulses produced by said pulse forming means are a unipolar pulse and a bipolar pulse that is a derivative of said unipolar pulse, said unipolar pulse and said bipolar pulse having ballistic deficit affected by said rise times of said output pulses.

9. The apparatus of claim 7 further comprising a calibration pulser means for producing a calibration pulse to be substituted for said output pulses of said detector as an input to said pulse forming means, and wherein said pulse forming means is provided with adjustment means to produce zero error signal from said difference determining means when said calibration pulse is substituted for said pulses from said detector.

10. The apparatus of claim 7 further comprising:
gating means for receiving said corrected amplitude pulse from said adding means for producing a rectangular pulse from said corrected amplitude pulse; and
buffer means including filter means for receiving said rectangular pulse and for producing a pulse having an exponential rise time and an exponential fall time for use by said multichannel analyzer means.

11. A method for achieving correction for ballistic deficit during the analysis of nuclear spectra using an ionizing radiation detector, said ballistic deficit due to the occurrence of charge collection at different locations within said detector, which comprises the following steps:
deriving output pulses from said detector due to ionizing radiation produced charge collection within said detector, each of said output pulses having a rise time governed by said location of said charge collection within said detector, said ballistic deficit affected by said rise times of said output pulses from said detector;
producing two separate pulses from each of said output pulses from said detector in a pulse forming means, one of said separate pulses being a unipolar pulse and a second of said separate pulses being a bipolar pulse that is a derivative of said unipolar pulse, said two separate pulses having different peaking times;
feeding said two separate pulses into two separate peak detecting means, one for said unipolar pulse and one for said bipolar pulse, to produce two stretched pulses;
comparing said stretched pulse of said unipolar pulse with said stretched pulse of said bipolar pulse to produce a difference signal representing a difference in amplitude between peaks of said two stretched pulses;
adding at least a portion of said difference signal to said stretched pulse of said unipolar pulse to produce a corrected amplitude pulse;
passing said corrected amplitude pulse through a gating means to produce a rectangular pulse;
passing said rectangular pulse through a buffer means, including a filter means, to produce a pulse having an exponential rise time and an exponential fall time; and
analyzing a plurality of said pulses having exponential rise and fall times in a multichannel analyzer to determine said nuclear spectra that is corrected for said ballistic deficit.

12. The method of claim 11 further comprising the steps:
providing a calibration pulse for processing in said two separate peak detection means; and
adjusting said pulse forming means whereby said error signal from said comparing of said two stretched output pulses of said separate peak detection means is zero in the absence of said output pulses from said detector.

13. The method of claim 11 wherein said comparing step is carried out with a difference amplifier means which receives said two stretched pulses from said two separate peak detection means.

14. The method of claim 11 wherein said adding step is carried out with a sum amplifier means which receives said error signal and adds said error signal to said stretched pulse of said peak detection means for said unipolar pulse to produce said corrected amplitude pulse.

* * * * *